United States Patent
Lagana

[15] 3,690,337
[45] Sept. 12, 1972

[54] SUPERSONIC DIVERTER

[72] Inventor: Joseph A. Lagana, Meriden, Conn.

[73] Assignee: Chandler Evans Inc., West Hartford, Conn.

[22] Filed: Jan. 19, 1970

[21] Appl. No.: 3,834

[52] U.S. Cl. .............................................137/81.5
[51] Int. Cl. ..........................................F15c 1/08
[58] Field of Search..................................137/81.5

[56] References Cited

UNITED STATES PATENTS

| | | | |
|---|---|---|---|
| 3,098,504 | 7/1963 | Joesting | 137/81.5 |
| 3,267,948 | 8/1966 | Groeber | 137/81.5 |
| 3,272,213 | 9/1966 | Jones | 137/81.5 |
| 3,310,985 | 3/1967 | Belsterling et al. | 137/81.5 X |
| 3,487,845 | 1/1970 | Stern | 137/81.5 |
| 3,508,579 | 4/1970 | Jones | 137/81.5 X |
| 3,517,559 | 6/1970 | Blazek | 137/81.5 X |
| 3,545,467 | 12/1970 | Kuiok et al. | 137/81.5 |
| 3,563,259 | 2/1971 | Jones | 137/81.5 X |

Primary Examiner—Samuel Scott
Attorney—Fishman and Van Kirk

[57] ABSTRACT

A supersonic diverter which provides supersonic streams of gas in either of two oppositely disposed power channels. Two oppositely directed supersonic fluid streams are both diverted into either a power channel or an augmentation channel by means of a supersonic fluidic switch. One supersonic stream is directed to a power channel and the oppositely directed fluid stream is directed into an augmentation channel where it is ducted to join the stream passing through the power channel. A switching device is employed to simultaneously divert the oppositely directed streams from the power channel to the augmentation channel in the one nozzle and from the augmentation channel and to the power channel in the other nozzle. The diversion of the supersonic streams in each nozzle is controlled by varying the transverse pressure gradients established near a recirculation region between separation and attachment points in the diverging portions of the supersonic nozzles.

8 Claims, 2 Drawing Figures

INVENTOR
JOSEPH A. LAGANA

BY Fishman + Van Kirk

ATTORNEY

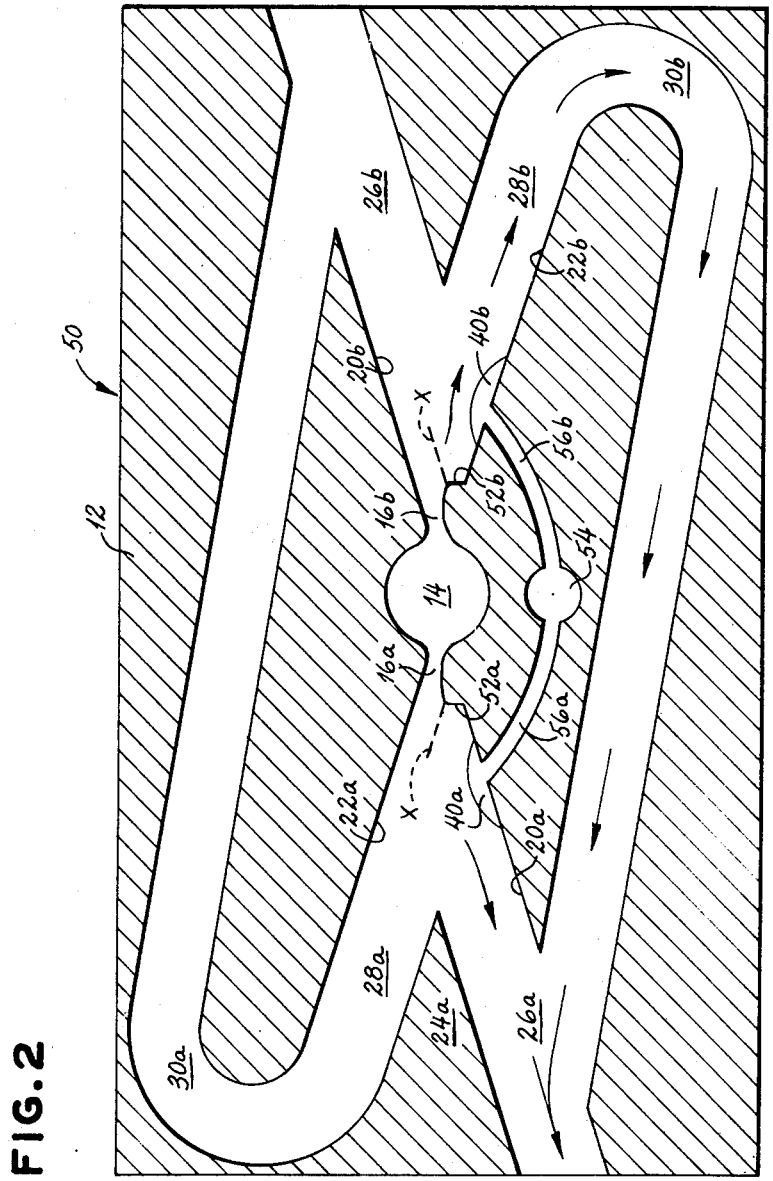

3,690,337

SUPERSONIC DIVERTER

BACKGROUND OF THE INVENTION:

1. Field of the Invention

The present invention relates to fluidics. More particularly, the present invention relates to fluid devices which are capable of providing supersonic streams along either of two oppositely directed channels. Accordingly, the general objects of the present invention are to provide novel and improved methods and apparatus of such character.

2. Description of the Prior Art

The development of devices such as missiles and space capsules in which the mechanism for controlling functions or movements of the device must react rapidly, be highly reliable and be of light weight has caused considerable attention to be given to the subject of fluidics. Fluidics may be defined as the field relating to the control of apparatus by jets or streams of fluid.

One of the most important devices in the field of fluidics is the fluid switch or relay. These relays produce a power jet which is diverted into one or more outlet passages that are connected to other fluid devices to perform various functions such as motor actuation or analog and digital functions.

One type of fluid switch operates principally in a subsonic mode. In these devices the jet is directed into a reaction chamber having diverging walls which may form a portion of the outlet passages with an intervening flow splitter. Generally, the power jet nozzle is spaced or offset slightly from the diverging walls to prevent immediate attachment of the power stream to the walls due to the well-known Coanda effect. This effect may be briefly stated as a tendency of a fluid in motion to flow along a contoured surface even when the surface is curved away from the principal direction of flow of the fluid. As a consequence of the offset, the directional character of the power jet can be influenced by injecting a small flow of fluid through oppositely disposed control ports at an angle to the power jet to thereby bias the power jet into one or more of the outlet passages formed between the diverging sidewalls and a flow splitter. The control ports may be connected to supplies of fluid which manifest various control parameters that are needed to bias the power jet stream. Without the influence of the control jets slight irregularities in the apparatus produce an assymetry of the flow due to the Coanda effect even though such result is not desired. By employing the offset and the control jets, it is possible to control the power stream by simple momentum theory effects.

In other prior art devices higher fluid pressures are used with gases to produce supersonic power jets. Such jets are frequently desirable because they provide higher velocity and consequently higher energy outputs to perform control functions. Varying degrees of success have been achieved with supersonic switches due to particular instability problems which arise when the impedance of the device operated by the supersonic stream is not tuned to the supersonic switch. A stable and highly efficient bistable supersonic fluidic switch is described in U.S. Pat. application, Ser. No. 786,684 filed by Raymond V. Thompson on Dec. 24, 1968, now U.S. Pat. No. 3,570,512. A monostable switch by the same inventor also forms the subject matter of U.S. Pat. application Ser. No. 855,672 filed Sept. 5, 1969. Both of these applications are related to the subject matter disclosed in this invention and are incorporated in this application by reference.

While the prior art devices are capable of diverting supersonic streams between two diverging output channels, it is frequently desirable to generate supersonic control streams along either of two directions disposed 180° from one another. Since the prior art switches divert jet fluids into two distinct outlet passages it is possible to turn the passages toward directions which are oriented substantially 180° from one another; however, this results in energy losses in the supersonic stream. Such energy losses may be avoided by employing two separate supersonic switches or diverters which are positioned back-to-back with the principal operating channels in each diverter being positioned substantially 180° from one another. Such back-to-back arrangements, however, are wasteful of the operating gas which is diverted in one of the principal operating channels when both nozzles are operated jointly to provide high response.

It is accordingly an object of the present invention to provide a supersonic diverter which produces supersonic thrusting jets from either of two channels which are disposed substantially 180° apart.

It is a further object of the present invention to provide a supersonic diverter which employs the operating gas to its fullest efficiency whenever the diverter is in operation.

SUMMARY OF THE INVENTION

The present invention relates to a supersonic diverter which has two separate power output channels which are disposed substantially 180° apart. The diverter also includes two augmentation channels which are the alternate output channels for the power channels whenever such power channels are to be rendered inoperative while the diverter itself is activated. The output of the augmentation channels is ducted to the power channel opposite that power channel rendered inoperative so that the output of the diverter is augmented and supersonic flow is not wasted.

The control of the supersonic switches in the diverter is accomplished by establishing a transverse pressure gradient in an operating region of the switch where the supersonic flow separates and reattaches to one of the side walls of a supersonic nozzle producing the fluid streams. Control pressures from the side walls can be applied in a recirculation region between a separation point and an attachment point of the stream to snap the stream from one sidewall to another and, consequently from one output channel to the other.

In one embodiment of the invention, a bistable supersonic switch, such as shown in U.S. Pat. application, Ser. No. 786,684, referenced above, is employed to accomplish the switching action between the power and augmentation channels. In another embodiment of the invention, a monostable switch such as shown in U.S. Pat. application, Ser. No. 855,672 referenced above, is employed to accomplish the switching action between the power and augmentation channels.

BRIEF DESCRIPTION OF THE DRAWINGS

The present invention may be better understood and its numerous advantages will become apparent to those skilled in the art by reference to the accompanying drawings wherein like reference numerals refer to like elements in the various figures and in which:

FIG. 2 shows another embodiment of the supersonic diverter which employs a monostable supersonic switch.

Figure 1:
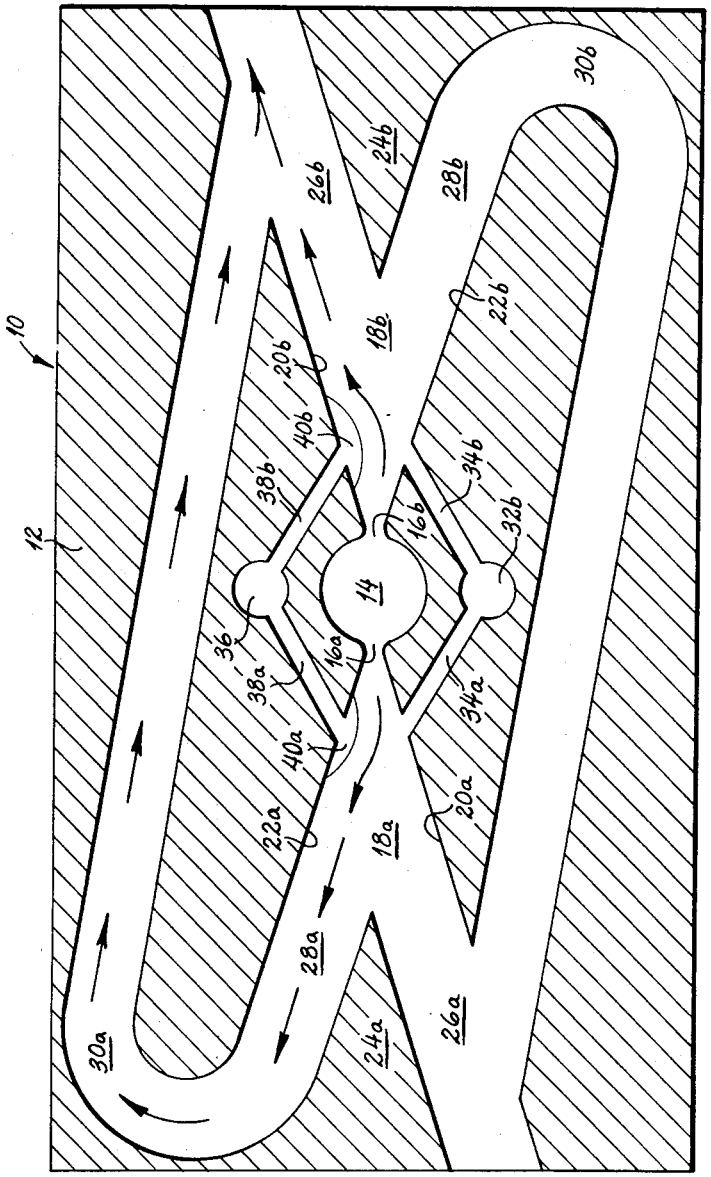
FIG. 1 shows one embodiment of the supersonic diverter which employs a bistable supersonic switch.

DESCRIPTION OF THE PREFERRED EMBODIMENTS:

With reference now to FIG. 1, a supersonic diverter 10 which provides supersonic streams of fluid along either of two directions which are substantially 180° apart is disclosed. The diverter 10 employs two bistable supersonic switches to perform the diverting functions.

The diverter 10 comprises a casing 12 which is etched or machined to include a centrally located fluid stagnation pressure chamber 14. The chamber 14 is connected to a source (not shown) of pressurized gas which will drive the diverter. Such source may be part of the thrust control system of a missile or space vehicle. Since the construction of the supersonic switch employs a plurality of features which are symetrically disposed about the chamber 14, corresponding reference numerals will be used to identify corresponding features and letter suffices will be employed to distinguish between the corresponding features.

Connected to opposite sides of stagnation chamber 14 are supersonic nozzles comprising a throat section 16 and a reaction chamber 18. The reaction chambers 18 are defined by diverging sidewalls 20 and 22. The production of a supersonic stream from the throat of a supersonic nozzle having converging and diverging walls is well known in the art and requires no further description. Downstream of the operating region 18, a flow splitter 24 is positioned substantially intermediate each of the diverging walls 20 and 22. The flow splitter 24 defines two separate discharging or outlet channels to which the supersonic stream emanating from the throat 16 may be diverted. The splitter 24 defines a power channel 26 with the diverging wall 20 and an augmentation channel 28 with the diverging wall 22. The augmentation channel 28a includes a turning section 30a which redirects the fluid diverted into channel 28a to the oppositely directed power channel 26b. As a consequence fluid passing through the augmentation channel will combine with the fluid in power channel 26b to provide a substantially reinforced jet of fluid along an axis substantially concentric with power channel 26b. Correspondingly, augmentation channel 28b includes a bending portion 30b which connects with the oppositely directed power channel 26a. Both the power channel and the augmentation channel can be designed to provide either pressure recovery or momentum transfer.

It will therefore be understood that the pressurized gas from chamber 14 can be transformed into two supersonic streams through the throats 16 and both supersonic streams can be directed to one of two power channels which are oppositely disposed with respect to one another. It is a further teaching of this invention that the two supersonic streams will be jointly directed to either of two oppositely directed power channels so that the diverter provides control streams which are substantially 180° displaced from one another. It therefore becomes a significant teaching of the present invention that oppositely directed supersonic streams can be joined by a novel arrangement of channels to provide a single stream of fluid which may be employed for any reversable control function.

In order to properly direct the two supersonic streams from the throats 16 to one of the power channels 26, control ports 32 and 36 are formed within the casting 12. The port 32 may be connected with the ambient environment into which the power channels 26 discharge or alternately may be connected with a source of pressurized gas such as that supplying chamber 14. The port 32 is connected to a point in the sidewall 20a by means of a control channel 34a and into a point in the sidewall 22b by means of a control channel 34b. In a similar manner, control port 36 is also connected to either the ambient or a source of gas and is connected to sidewall 22a by means of control channel 38a and with sidewall 20b by means of control 38b.

The operation of the supersonic diverter 10 depends upon the principals of operation of a supersonic switch taught in U.S. Pat. applications, Ser. Nos. 786,684 and 855,672 referred to above. For a detailed explanation of the operation of the supersonic switch, reference may be had to the above applications. A very brief synopsis follows for a rudimentary understanding of the present invention.

Gas leaving chamber 14 at a prescribed pressure will form a supersonic stream emanating from the throat 16 provided a proper ambient pressure exists downstream of the operating region 18 of the nozzle. Where the diverter is employed as altitude control nozzle for a space vehicle, the ambient pressure may be atmospheric pressure or a lower pressure such as found in regions of space outside our atmosphere. A bistable supersonic fluid switch, as shown in FIG. 1, is characterized by the symmetric positioning of the diverging walls 20 and 22. The supersonic stream may initially display a preference to follow one of the diverging walls 20 or 22 in the absence of other controlling influences; however, one the stream is directed by controlling influences to attach to either of the walls 20 or 22, the attached wall becomes the preferred wall according to the bistable nature of the switch.

By properly controlling the ambient or discharge pressure of the nozzle, the supersonic stream can be made to separate and reattach to the preferred wall at a given region of the wall. Between the separation and reattachment points a recirculation region, identified in FIG. 1 by the reference numeral 40, is formed. The exact location of the separation point and the length and the curvature of the recirculation region are determined by the overall pressure differential between the chamber 14 and the discharge pressure of the nozzle. The control channels 34 and 38 are positioned at a point in the diverging walls 20 and 22 so that they always communicate with the recirculation region expected under the pressure conditions at which the diverter will be operated.

Once the supersonic stream has attached to one of the sidewalls 20 or 22, the gas stream will continue to follow the channel 26 or 28, respectively, formed by that sidewall and the splitter 24 and will be held against that sidewall by means of a transverse pressure differential which is generated in the operating region 18. The pressure differential on the free stream side will be no greater than the ambient discharge pressure and the pressure on the opposite side of the stream in the recirculation region will be less than ambient discharge pressure.

In order to switch the supersonic stream from the one sidewall to the opposite sidewall, ambient pressure or a control pressure slightly above ambient is supplied through the one of the control ports 32 or 36 opposite the desired sidewall to which the supersonic stream is to attach while the opposite port is closed. This introduction of pressure to the one of the control ports 32 or 36 establishes a pressure differential in the operating region 18 which forces the supersonic stream to the opposite sidewall. For example, the supersonic streams are directed through power channel 26b and augmentation channel 28a, as shown by the arrows in FIG. 1, when a control pressure is admitted through port 32 and control channels 34a and 34b while port 36 is closed. The supersonic streams are accordingly biased by the established pressure differentials in region 18 to the sidewalls 22a and 20b. Alternately, the recirculating regions 40a and 40b can be established at the opposite sidewalls 20a and 22b when the associated pressure differentials are reversed by opening port 36 and closing port 32.

It will therefore be understood that by proper operation of the control ports 32 and 36, the both supersonic streams emanating from the throats 16 may be discharged through a selected one of the power channels 26. Further, the deflection of the supersonic streams can be reversed by reciprocally opening and closing the ports 32 and 36.

FIG. 2 discloses another embodiment of the supersonic diverter 50 which employs monostable supersonic switches such as those discussed in the above-referenced U.S. Pat. application No. 855,672.

The operation of the diverter 50 shown in FIG. 2 is slightly different from that in FIG. 1. Corresponding parts of the diverter 50 bear the same reference numerals as the diverter 10 shown in FIG. 1.

In the operation of the diverter 50, the pressure differentials between the chamber 14 and discharge apertures of power chambers 26 again establish supersonic streams emanating from the throats 16. Flow splitters 24 define both the oppositely directed power channels 26 and augmentation channels 28 in each of the diffusing sections of the supersonic nozzles.

The feature which distinguishes the diverter 50 in FIG. 2 from the diverter 10 of FIG. 1 is the use of monostable supersonic switches. Monostable switches are characterized by an offset 52 of one of the diverging walls in the supersonic nozzle. By proper control of the discharging pressures of the power channel 26, an oblique shock wave generally designated X will be established in the supersonic stream which accompanies a bending of the stream toward the sidewall 20a or 22b. The offset 52 establishes a preference of the supersonic stream to follow along the offset walls as is described more particularly in the referenced U.S. application No. 855,672. Again, for detailed explanation of the full phenomenon which accompanies the use of the monostable switch, reference may be had to this prior application. Very briefly, the downstream pressure in the supersonic nozzle can be adjusted to again cause separation and reattachment of the supersonic stream on opposite sides of the recirculation region 40. The recirculation region 40 in the monostable switch is automatically positioned at the offset diverging wall 20a or 22b in the absence of external influences. As a consequence, the supersonic streams emanating from throats 16 are both directed to power channel 26a due to the transverse pressure gradients established in the vicinity of the recirculation regions 40. As described in the referenced application, the supersonic streams can be deflected to the opposite diverging walls 22a and 20b by applying pressurized gas to the recirculation regions and thereby reversing the transverse pressure differentials which hold the supersonic streams adjacent the preferred walls. Control port 54 and control channels 56 are provided for this purpose. The port 54 may be connected to the source of pressure which supplies gas to chamber 14 or to the ambient pressure to which the power channels are connected. Pressure applied through channels 56 destroys the normally low pressures in the recirculation regions and establishes a transverse gradient which favors deflection of the supersonic streams to the opposite diverging walls 22a and 20b.

It will be readily recognized that the advantage of the FIG. 2 embodiment is the requirement for only one control port. In operating the diverter 50 the offsets 52 determine a preference of the supersonic streams for power channel 26a. Whenever gas is supplied to chamber 14 a stable operating mode directing gas to power channel 26a is established until control gas is applied through port 54 to each of the recirculation regions. The diverter 50 therefore may be employed where jet streams 180° apart are required and may be particularly advantageous in systems where a predominent stream is desired such as in a spin stabilized body where the spin rate of a preselected value is desired. The preferred power channel would be oriented to establish the initial spin rate and both channels could be subsequently employed to maintain the desired spin rate.

The several embodiments of the invention disclose supersonic diverters which provide supersonic streams along directions which are substantially opposite one another in response to commands given the diverter. The diverters direct all gases in two supersonic streams to one power channel and consequently losses of gas diverted into a waste channel are avoided. The power channels provide a direct stream of supersonic gas which is reinforced by gas from the augmentation channel. Both the power channel and the augmentation channel can be designed to provide either pressure recovery or momentum transfer depending upon the particular output desired.

While the invention has been described in two particular embodiments, it should be understood that various modifications can be made without departing from the particular features essential to the described operations. For example, it will be readily understood that the pressure chamber 14 may be isolated from the diverter itself and a valve interposed between the chamber and the throats 16 to permit intermittent generation of the supersonic streams when desired. Still further, control valves of various types may be employed in conjunction with the control ports to establish the proper control pressures in the recirculation regions. Still further, modifications which permit the establishment of artificial ambients in the supersonic nozzles may be established in the same manner as taught in U.S. application, Ser. No. 855,672. Accordingly, it is to be understood that while preferred embodiments have been shown and described, the invention is described by way of illustration and not limitation.

Having thus described the invention, I claim:

1. A supersonic diverter for producing oppositely directed fluid streams comprising:

fluid chamber means;

a pair of oppositely disposed converging-diverging nozzle means connected to the chamber means for discharging oppositely directed streams of fluid into the diverging portions of the nozzle means at supersonic velocity, each diverging portion including first and second diverging side walls defining an operating region therebetween;

control means for causing supersonic streams of fluid discharged into the operating regions to separate and reattach to one of the side walls in the operating regions of each diverging portion, low pressure recirculation regions being established between the points of separation and reattachment and transverse pressure unbalances being created across the fluid stream in the vicinity of the recirculation regions;

flow splitting and directing means positioned downstream of the operating region in each nozzle means and defining in each nozzle means a power channel contiguous with the first of the side walls and an augmentation channel contiguous with the second of the side walls, the augmentation channels of each nozzle means being connected respectively to the power channels of the oppositely disposed nozzle means downstream of the recirculation regions; and fluid diverting means for controllably establishing the transverse pressure unbalance toward the first of the side walls and the power channel in the operating region of one nozzle means and toward the second of the side walls and the augmentation channel in the operating region of the other nozzle means whereby the fluid stream of both nozzle means are diverted to the power channel of the one nozzle means.

2. The supersonic diverter of claim 1 wherein:

the fluid diverting means is a reversible fluid switching means for reversing the transverse pressure unbalances in the operating regions of both nozzle means whereby the fluid streams of both nozzle means may be diverted to the power channel of the other nozzle means.

3. The supersonic diverter of claim 2 wherein:

the reversible fluid switching means is a bistable fluid switch.

4. The supersonic diverter of claim 2 wherein:

the reversible fluid switching means includes two pressure control conduits connected from a common pressure source respectively to the first of the side walls in the one nozzle means and the second of the side walls in the other nozzle means.

5. The supersonic diverter of claim 4 wherein:

the control conduits are connected to the first and the second of the side walls between the locations of the points of separation and reattachment.

6. The supersonic diverter of claim 4 wherein:

the reversible fluid switching means includes additional pressure control conduits connected from a common pressure source respectively to the second of the side walls in the one nozzle means and the first of the side walls in the other nozzle means.

7. The supersonic diverter of claim 6 wherein:

the additional control conduits are connected to the second and the first of the side walls between the locations of the points of separation and reattachment.

8. Apparatus for generating streams of fluid along either of two oppositely disposed directions comprising:

a stagnation chamber;

a pair of nozzles, said nozzles respectively discharging in substantially opposite directions from said chamber, each of said nozzles having a throat section and a diverging section;

a flow splitter disposed in the divergent section of each of said nozzles, said flow splitters defining first and second outlet passages in each nozzle for fluid streams generated by the nozzles;

first conduit means interconnecting the first outlet passage of one nozzle to the second outlet passage of the other nozzle;

second conduit means interconnecting the second outlet passage of the said one nozzle to the first outlet passage of the said other nozzle;

a first pair of conduits connected jointly with a common pressure source and connected respectively with the diverging sections of said nozzles upstream of the first outlet passage of the said one nozzle and the second outlet passage of the said other nozzle; and a second pair of conduits connected jointly with a common pressure source and connected respectively with the diverging sections of said nozzles upstream of the second outlet passage of said one nozzle and the first outlet passage of the said other nozzle.

* * * * *